(12) United States Patent
Issenmann et al.

(10) Patent No.: US 8,675,873 B2
(45) Date of Patent: Mar. 18, 2014

(54) METHOD OF MAKING SECURE A LINK BETWEEN A DATA TERMINAL AND A DATA PROCESSING LOCAL AREA NETWORK, AND A DATA TERMINAL FOR IMPLEMENTING THE METHOD

(75) Inventors: Edouard Issenmann, Chesnay (FR); Patrick Poiraud, Jouey-en Josas (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 13/154,527

(22) Filed: Jun. 7, 2011

(65) Prior Publication Data

US 2011/0311047 A1    Dec. 22, 2011

Related U.S. Application Data

(63) Continuation of application No. PCT/FR03/01147, filed on Apr. 11, 2003.

(30) Foreign Application Priority Data

Apr. 11, 2002  (FR) .................................... 02 04524

(51) Int. Cl.
*H04W 12/00*    (2009.01)
*G06F 21/00*    (2013.01)

(52) U.S. Cl.
USPC .......................................... 380/247; 713/153

(58) Field of Classification Search
None
See application file for complete search history.

(56) References Cited

U.S. PATENT DOCUMENTS

| | | | |
|---|---|---|---|
| 2002/0009199 A1* | 1/2002 | Ala-Laurila et al. | 380/247 |
| 2002/0036991 A1 | 3/2002 | Inoue et al. | |
| 2002/0052965 A1 | 5/2002 | Dowling | |
| 2002/0085511 A1* | 7/2002 | Koponen et al. | 370/315 |

FOREIGN PATENT DOCUMENTS

| | | |
|---|---|---|
| EP | 1146692 A2 | 10/2001 |
| EP | 1178644 A2 | 2/2002 |
| EP | 1257141 A1 | 11/2002 |

OTHER PUBLICATIONS

International Search Report for PCT/FR03/01147 dated Sep. 23, 2003.
European Search Report for Corresonding EP 03290908.7 dated Jul. 4, 2003.
Corresponding French Search Report for FR0204524 dated Jan. 24, 2033.

* cited by examiner

*Primary Examiner* — Gilberto Barron, Jr.
*Assistant Examiner* — Malcolm Cribbs
(74) *Attorney, Agent, or Firm* — Wolff & Samson, PC

(57) ABSTRACT

This method makes secure a link, for example a radio link, between a data terminal (PDA2) and a data processing local area network (WLAN2) that is coupled to a mobile telephone network (PLMN2) that includes an authentication center (AU2). It consists in: linking (L3) the data terminal (PDA2) to a mobile telephone terminal (T2) that includes means (SIM3) for executing a procedure for making secure a radio link between said mobile telephone terminal (T2) and the mobile telephone network (PLMN2), said procedure including in particular exchanging information with the mobile telephone network (PLMN2), said exchange of information usually being supported by a radio link between the mobile telephone terminal (T2) and the mobile telephone network (PLMN2); executing the same procedure in the mobile telephone terminal (T2), but with the exchange of information supported by the link (L4) between the data terminal (PDA2) and the data processing local area network (WLAN2) and by an inter-working link (IL2) connecting the data processing wireless local area network (WLAN2) and the mobile telephone network (PLMN2); and transferring the result of this procedure from the mobile telephone terminal (T2) to the data terminal (PDA2).

12 Claims, 2 Drawing Sheets

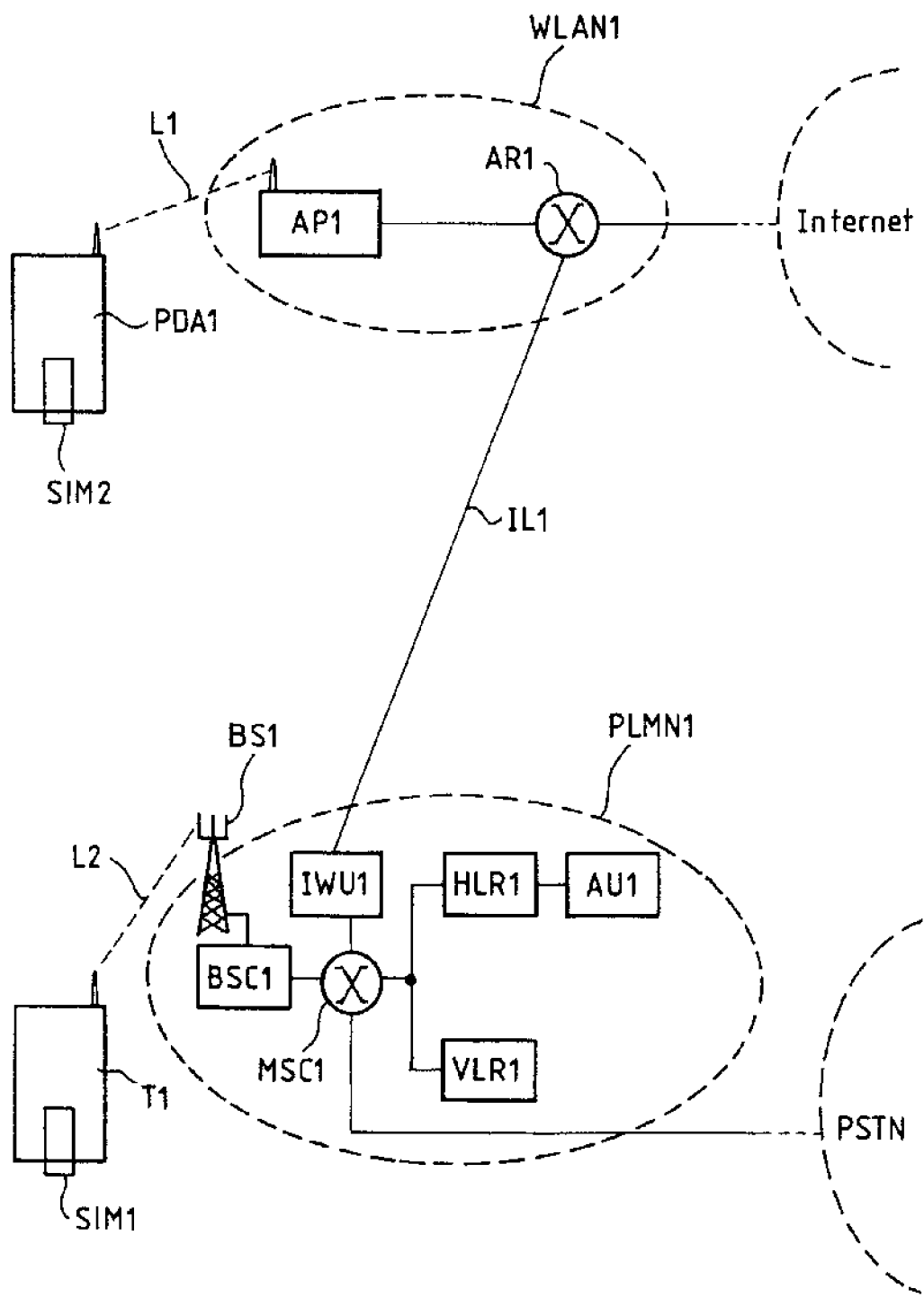

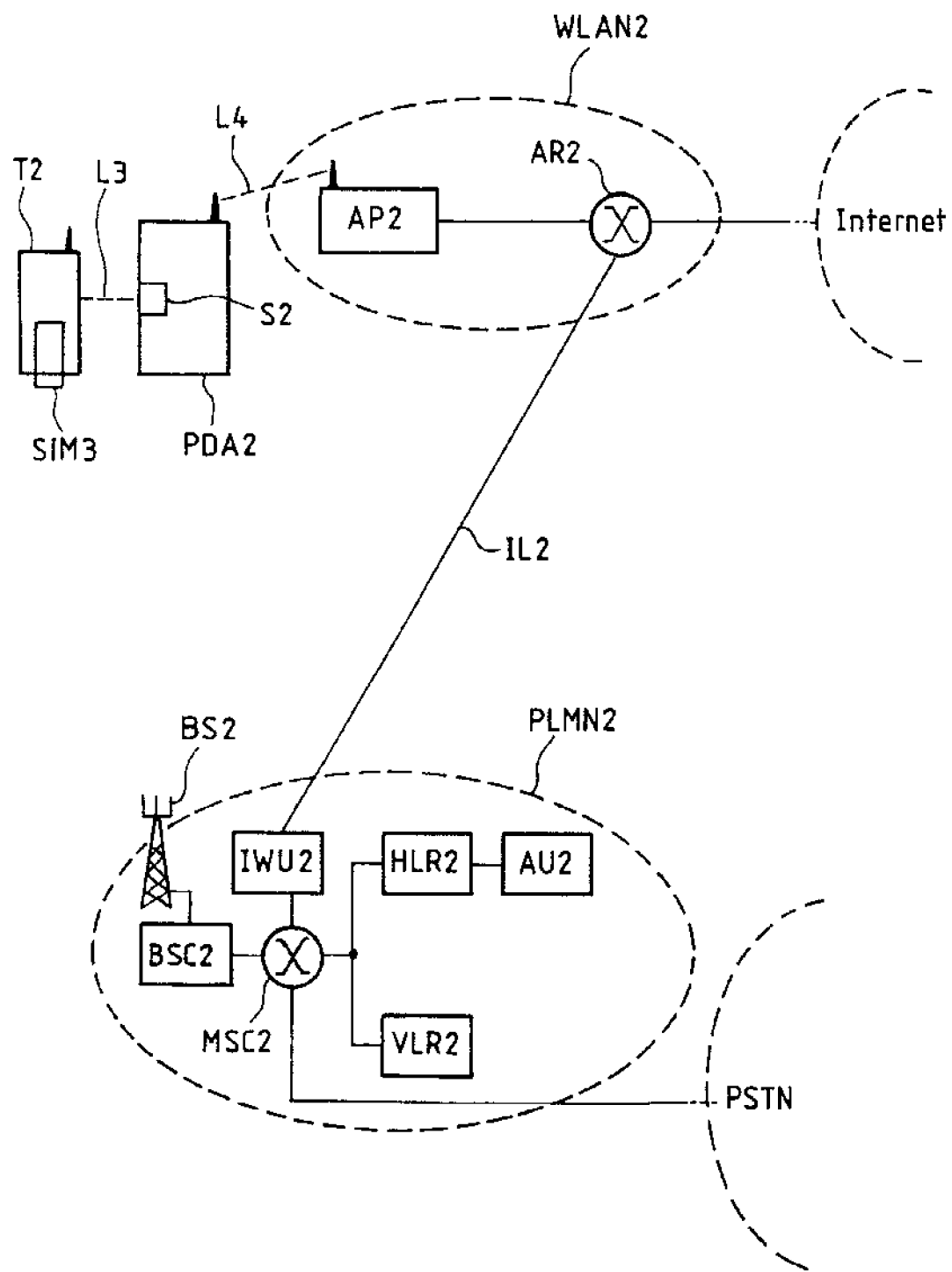
FIG_2

METHOD OF MAKING SECURE A LINK BETWEEN A DATA TERMINAL AND A DATA PROCESSING LOCAL AREA NETWORK, AND A DATA TERMINAL FOR IMPLEMENTING THE METHOD

The present application is a continuation of application No. PCT/FR2003/001147, filed on Apr. 11, 2003 and published as WO2003/085886, claiming priority from French Application No. 02/04524 filed Apr. 11, 2002, the disclosures of which are incorporated herein.

The invention relates to a method of making secure a link, in particular a radio link, between a data terminal and a data processing local area network, and it also relates to a data terminal for implementing the method.

It is possible to exchange data between a first mobile data terminal and a remote second data terminal via a mobile telephone terminal connected to a mobile telephone network. The data terminal is connected to the mobile telephone terminal by means of a cable, for example. However, in the current state of mobile telephone networks, the data bit rate is low. Another method known in the art that provides a higher bit rate consists in connecting the data terminal to a data processing local area network, in particular a wireless local area network conforming to the IEEE 802.11b standard. Wireless local area networks are installed in places such as hotels, airports, etc. A portable computer may be connected to a network of this kind by inserting into a port of the computer a wireless link card compatible with the IEEE 802.11b standard, for example. This kind of network provides a high data bit rate but must employ a method of making the link secure, i.e. for authenticating the identity of the user, and for protecting the data against interception, with a level of security at least as good as that offered by a mobile telephone network.

FIG. 1 shows a method known in the art of making secure a link between a data terminal, for example a personal digital assistant PDA1, and a data processing wireless local area network WLAN1. The network WLAN1 comprises radio access points AP1 and an access router AR1. It is connected to a mobile telephone network PLMN1, for example a GSM network, by an interworking link IL1. The network WLAN1 is also connected to the Internet via an access router AL1.

The network PLMN1 includes base stations BS1 connected to a mobile service switching center MSC1 via a base station controller BSC1. The mobile service switching center MSC1 is also connected to the public switched telephone network PSTN, to a home location register HLR1, and to a visitor location register VLR1. The home location register HLR1 is connected to an authentication center AU1. The interworking link IL1 connects the access router AR1 to the mobile service switching center MSC1 via an interworking unit IWU1 that implements an interface circuit such that security parameters coming from the wireless local area network WLAN1 are perceived by the mobile service switching center MSC1 as if they came from a base station controller BSC1.

First of all, consider the procedure conventionally used to secure a radio link L2 between a mobile telephone terminal T1, for example, and the GSM mobile telephone network PLMN1; there is a similar but enhanced procedure for the UMTS. Like any GSM mobile telephone terminal, the terminal T1 is fitted with a subscriber identity module card SIM1. This card SIM1 contains in particular a secret encryption key Ki that is specific to it. The authentication center AU1 contains a copy of the encryption key Ki.

Following a request for security parameters from the HLR1, the authentication unit AU1 chooses a random number RAND1 and calculates a signature SRES1 using the secret key Ki specific to the terminal T1 and a first algorithm that is also known to the card SIM1, and calculates an encryption key Kc using a second algorithm that is also known to the card SIM1. The "triplet" of values RAND1, Ki, SRES1 is sent to the visitor location register VLR1. A plurality of triplets may be sent and stored in the visitor location register VLR1 for the same terminal T1.

Each triplet RAND, Ki, SRES is used by the visitor location register VLR1 to authenticate a call request and to encrypt/decrypt information transmitted after setting up a call, the information transmitted in both directions being encrypted using the key Kc.

When the mobile telephone terminal T1 requests the setting up of a call with the mobile telephone network PLMN1, it sends its international mobile subscriber identity number IMSI1 or its temporary mobile subscriber identity number TMSI1 to the visitor location register VLR1 which serves the area in which it is situated. The visitor location register VLR1 determines from this identity number IMSI1 or TMSI1 the home location register HLR1 for the terminal T1; the visitor location register VLR1 may be able to retrieve the triplets relating to this terminal from its memory, but if its memory contains no triplets for the terminal in question, it calls the home location register HLR1 and sends it the identity number IMSI1 of the terminal T1 and its own identity. The home location register HLR1 then obtains the necessary triplets from the authentication center AU1 and sends them to the visitor location register VLR1.

The prior art method of making secure a link between the data terminal PDA1 and the access point AP1 includes a procedure analogous to that outlined hereinabove except that the exchange of information is not supported by a GSM radio link with the network PLMN1 but instead by a radio link L1 with the wireless local area network WLAN1 and the interworking link IL1.

The data terminal PDA1 includes an identity card reader into which is inserted an identity card SIM2 similar to the subscriber identity module card SIM1. It includes software for executing a procedure similar to that outlined hereinabove. Thus the interworking link IL1 between the networks WLAN1 and PLMN1 enables the wireless local area network WLAN1 to use the authentication service offered by the center AU1.

That prior art method has two drawbacks, however. The terminal PDA1 must include an identification card reader. The user of a mobile telephone terminal T1 and a data terminal PDA1 must either have two identification cards SIM1 and SIM2, and thus two subscriptions, or transfer a single SIM card from one terminal to another, which is not practical. Also, this rules out beginning a call in a wireless local area network and continuing it in a mobile telephone network, or vice versa, without interrupting the call. Moreover, there is no synchronization between data stored in the data terminal PDA1 and data stored in the mobile telephone terminal T1, such as address book data.

The object of the invention is to overcome these drawbacks.

The invention consists in a method of making secure a link between a data terminal and a data processing local area network that is coupled to a mobile telephone network that includes an authentication center, which method is characterized in that it consists in:

linking the data terminal to a mobile telephone terminal that includes means for executing a procedure for making secure a radio link between said mobile telephone terminal and the mobile telephone network, said procedure including in particular exchanging security information with the mobile telephone network, said exchange of security information usually being supported by a radio link between the mobile telephone terminal and the mobile telephone network;

executing the same procedure in the mobile telephone terminal, but with the exchange of security information supported by the link between the data terminal and the data processing local area network and by an interworking link connecting the data processing wireless local area network and the mobile telephone network; and transferring the result of this procedure from the mobile telephone terminal to the data terminal.

The above method enables an authentication center created for a mobile telephone network to make secure a radio link between a data terminal and a data processing local area network with the same level of security as a radio link in a standard mobile telephone network, because it uses essentially the same procedure. However, it does not necessitate a data terminal identity card or a card reader in the data terminal, as it uses a mobile telephone terminal interworking with the data terminal so that the authentication center perceives only one entity at the other end of the link.

The invention also consists in a data terminal including means for setting up a link with a data processing local area network and means for setting up a link with a mobile telephone terminal including means for executing a procedure for making secure a radio link between said mobile telephone terminal and a mobile telephone network that includes an authentication center, this procedure including in particular exchanging security information with the mobile telephone network, said exchange of security information usually being supported by a radio link between the mobile telephone terminal and the mobile telephone network, which terminal is characterized in that, for implementing the above method, it includes:

means for commanding execution of said procedure in said mobile telephone terminal with the exchange of security information supported by a link between the data terminal and the data processing local area network and by an interworking link connecting the data processing local area network and the mobile telephone network; and means for transferring the result of the above procedure from the mobile telephone terminal to the data terminal and using said result to encrypt and decrypt data exchanged afterwards over said link between the data terminal and the data processing local area network.

The invention will be better understood and its other features will become apparent in the light of the following description and the accompanying drawings, in which:

FIG. 1, already described, shows a prior art method, and

FIG. 2 shows an implementation of a method of the invention for making secure a radio link L4 between a data terminal PDA2 and a wireless local area network WLAN2.

The terminal PDA2 is a conventional personal digital assistant, for example, except that it is provided with interworking software S2 adapted to implement the method of the invention. It does not need to include a card reader. It is connected to a standard GSM or UMTS mobile telephone terminal by a link L3 that is usually employed to exchange data. The link L3 may be a cable link, an infrared link or a Bluetooth radio link. The terminal T2 includes an identification card reader into which is inserted an identification card SIM3 that is usually employed to make secure a radio link between the terminal T2 and a GSM mobile telephone network PLMN2 to which the terminal T2 subscribes.

The network WLAN2 includes radio access points AP2 and an access router AR2. It is connected to the mobile telephone network PLMN2 by an interworking link. The network WLAN2 is also connected to the Internet via the access router AR2.

The network PLMN2 includes base stations BS2 connected to a mobile service switching center MSC2 via a base station controller BSC2. The mobile service switching center MSC2 is further connected to the public switched telephone network PSTN, a home location register HLR2, and a visitor location register VLR2. The home location register HLR2 is connected to an authentication center AU2. The interworking link IL2 connects the access router AR2 to the mobile service switching center MSC2 via an interworking unit IWU2 that has an interface function such that security parameters coming from the wireless local area network WLAN2 are perceived by the mobile service switching center MSC2 as if they came from a base station controller BSC2.

The interworking software S2 collaborates with the card SIM3 to execute the procedure for making the link L4 secure using standard functions provided for mobile telephone terminal identity card applications. Exchanges of security information with the PLMN2 are supported by the radio link L4, the radio access point AP2, the access router AR2, the interworking link IL2, the interworking unit IWU2, and the mobile service switching center MSC2.

When the data terminal PDA2 requests the setting up of a radio link L4 with the network WLAN2, the interworking software S2 executes the authentication and encryption procedure by commanding the necessary operations in the card SIM3. The combination of the terminal T2 and the terminal PDA2 is perceived as a single entity by the mobile telephone network PLMN2 and is served by the visitor location register VLR2 that is associated with the mobile service switching center MSC2 to which the interworking link IL2 is connected.

The terminal T2 sends its international mobile subscriber identity number IMSI2 to the visitor location register VLR2. The visitor location register VLR2 determines the home location register HLR2 that manages the terminal T2 from its identity number IMSI2; it may be able to retrieve the triplets relating to the terminal T2 terminal from its memory, but if there are no triplets for that terminal in its memory it calls the home location register HLR2 and sends it the identity number IMSI2 of the terminal T2 and its ownidentity. The home location register HLR2 then obtains the necessary triplets from the authentication unit AU2 and sends them to the visitor location register VLR2.

Following the request from the home location register HLR2, the authentication center AU2 chooses a random number RAND2 and calculates a signature SRES2 using the secret key Ki specific to the terminal T2 and a first algorithm that is also known to the card SIM2, and calculates an encryption key Kc using a second algorithm that is also known to the card SIM2. The set of three values RAND2, Ki, SRES2, forming what is referred to herein as a "triplet", is sent to the visitor location register VLR2. Several triplets for the same terminal T2 may be sent to and stored in the VLR2.

The visitor location register VLR2 uses the triplet RAND2, Ki, SRES2 to authenticate a call request sent by the combination T2-PDA2 by verifying the value SRES2 sent by the combination T2-PDA2.

The card SIM3 calculates the encryption key Kc from the number RAND2 using the second algorithm. The data terminal PDA2 commands the transfer of the key Kc to the terminal PDA2 for subsequent use to encrypt/decrypt data exchanged over the radio link L4 with the wireless local area network WLAN2, while the visitor location register VLR2 communicates the same key Kc to the radio access point AP2 at the other end of the radio link L4. The radio link L4 between the terminal PDA2 and the local area network WLAN2 is therefore protected against interception of data with a level of security identical to that of the mobile telephone network PLMN2.

The radio link L4 may be of any type that is known in the art (IEEE 803.11a, 802.11b, Bluetooth, etc.) or developed in the future.

An implementation of the method of the invention is applied in a data terminal that is not connected to a data processing local area network by a radio link, but instead by an infrared link or merely by a cable, as in standard data processing local area networks.

Note that the link L3 between the data terminal PDA2 and the telephone terminal T2 retains all its usual functions, for example synchronizing the data of the two terminals. Note that the mobile telephone terminal T2 also retains all its usual functions, and therefore provides a GPRS link for exchanging packets of data with the mobile telephone network PLMN2 while the data terminal PDA2 is communicating with the local area network WLAN2 via the link L4, for example.

The scope of the invention is not limited to GSM mobile telephone networks and terminals. The invention is applicable in a similar manner to mobile telephone networks and terminals using authentication and encryption procedures similar to or derived from GSM procedures.

The invention claimed is:

1. A method of making secure a link between a data terminal and a data processing local area network that is coupled to a mobile telephone network that includes an authentication center, which method is characterized in that it consists in:
    linking the data terminal to a mobile telephone terminal that includes secure means for executing a procedure for making secure a radio link between said mobile telephone terminal and the mobile telephone network, said procedure including in particular exchanging security information with the mobile telephone network, said exchange of security information being supported by a radio link between the mobile telephone terminal and the mobile telephone network;
    executing the same procedure in the mobile telephone terminal, but with the exchange of security information supported by the link between the data terminal and the data processing local area network and by an interworking link connecting the data processing wireless local area network and the mobile telephone network; and
    transferring the result of this procedure from the mobile telephone terminal to the data terminal.

2. A method according to claim 1, characterized in that the result of the procedure is the production of an encryption key that is transferred from the mobile telephone terminal to the data terminal and from the mobile telephone network to an access point of the local area network and in that said key is used to encrypt and decrypt data exchanged afterwards over said link between the data terminal and the data processing local area network.

3. A method according to claim 1, characterized in that the data processing local area network is a wireless network conforming to the IEEE 802.11 standard.

4. A method according to claim 1, characterized in that the data processing local area network is a wireless network conforming to the Bluetooth standard.

5. A method according to claim 1, characterized in that the data processing local area network is an infrared link wireless network.

6. A method according to claim 1, characterized in that the data processing local area network is a cable network.

7. A data terminal including means for setting up a link with a data processing local area network and means for setting up a link with a mobile telephone terminal including means having a processor executing software instructions for executing a procedure for making secure a radio link between said mobile telephone terminal and a mobile telephone network that includes an authentication center, this procedure including in particular exchanging security information with the mobile telephone network, said exchange of security information usually being supported by a radio link between the mobile telephone terminal and the mobile telephone network, which terminal is characterized in that, for implementing the method according to claim 1, it includes:
    means including a processor executing software instructions for commanding execution of said procedure in said mobile telephone terminal, with the exchange of security information supported by a link between the data terminal and the data processing local area network and by an interworking link connecting the data processing local area network and the mobile telephone network; and
    means including a processor executing software instructions for transferring the result of the above procedure from the mobile telephone terminal to the data terminal and using said result to encrypt and decrypt data exchanged afterwards over said link between the data terminal and the data processing local area network.

8. A data terminal according to claim 7, characterized in that the link with a data processing local area network is a wireless link conforming to the IEEE802.11 standard.

9. A data terminal according to claim 7, characterized in that the link with a data processing local area network is a wireless link conforming to the Bluetooth standard.

10. A data terminal according to claim 7, characterized in that the link with a data processing local area network is an infrared link.

11. A data terminal according to claim 7, characterized in that the link with a data processing local area network is a cable link.

12. A data terminal capable of establishing a first link with a data processing local area network and a second link with a mobile telephone terminal, said mobile telephone terminal being capable of executing a procedure for making secure a radio link between said mobile telephone terminal and a mobile telephone network that includes an authentication center, said procedure including exchanging security information with the mobile telephone network over a path that includes a radio link between the mobile telephone terminal and the mobile telephone network, wherein said data terminal includes:
    a first component commanding execution of said procedure in said mobile telephone terminal, except with the exchange of security information being over a path comprising said first link and a third link between the data processing local area network and the mobile telephone network; and
    a component which transfers the result of the procedure commanded by said first component from the mobile telephone terminal to the data terminal and uses said result to encrypt and decrypt data exchanged afterwards over said link between the data terminal and the data processing local area network.

* * * * *